United States Patent
Wycislik

(10) Patent No.: US 11,266,553 B2
(45) Date of Patent: Mar. 8, 2022

(54) MOBILE WHEELCHAIR/CHAIR, IN PARTICULAR FOR THE DISABLED

(71) Applicant: Jan Wycislik, Katowice (PL)

(72) Inventor: Jan Wycislik, Katowice (PL)

(*) Notice: Subject to any disclaimer, the term of this patent is extended or adjusted under 35 U.S.C. 154(b) by 52 days.

(21) Appl. No.: 16/677,905

(22) Filed: Nov. 8, 2019

(65) Prior Publication Data

US 2020/0146906 A1 May 14, 2020

(30) Foreign Application Priority Data

Nov. 9, 2018 (PL) ................................. PL427721

(51) Int. Cl.
| | | |
|---|---|---|
| *A61G 5/04* | (2013.01) | |
| *A61G 5/10* | (2006.01) | |
| *A61G 5/12* | (2006.01) | |
| *B60K 7/00* | (2006.01) | |

(52) U.S. Cl.
CPC ............ *A61G 5/043* (2013.01); *A61G 5/1051* (2016.11); *A61G 5/128* (2016.11); *B60K 7/0007* (2013.01)

(58) Field of Classification Search
CPC ...... A61G 5/043; A61G 5/1051; A61G 5/128; A61G 5/04; A61G 5/10; A61G 5/12; B60K 7/0007
USPC .......................................................... 180/23
See application file for complete search history.

(56) References Cited

U.S. PATENT DOCUMENTS

| | | | | |
|---|---|---|---|---|
| 5,183,133 A | * | 2/1993 | Roy ...................... | A61G 5/043 180/13 |
| 5,236,055 A | * | 8/1993 | Legal ................... | B60K 7/0007 180/65.51 |
| 5,445,233 A | * | 8/1995 | Fernie .................... | B60K 1/00 180/6.5 |
| 5,649,605 A | * | 7/1997 | Rønne .................... | A47C 7/006 180/23 |
| 2006/0087097 A1 | * | 4/2006 | Kramer ................ | A61G 7/1059 280/304.1 |
| 2008/0066974 A1 | * | 3/2008 | Pearlman ............... | A61G 5/128 180/22 |
| 2018/0250179 A1 | * | 9/2018 | Omer .................... | A61G 5/043 |

FOREIGN PATENT DOCUMENTS

| | | |
|---|---|---|
| CN | 201088676 Y | 7/2008 |
| CN | 202908972 U | 5/2013 |

* cited by examiner

*Primary Examiner* — James A Shriver, II
*Assistant Examiner* — Hilary L Johns
(74) *Attorney, Agent, or Firm* — Dickinson Wright PLLC; Andrew D. Dorisio

(57) ABSTRACT

A mobile wheelchair/chair, especially for the disabled, having a body support system mounted on the casing, a swivel and drive assembly and castors is characterized in that the swivel and drive assembly equipped with drive motor (8) and swivel motor (5) has s form of coupled vertical fixed fork (6) furnished with at least one swivel wheel (7), and seat (3) is mounted on the steering and swivel axis of fixed fork (6), with swivel motor (5) located in the upper part of the steering and swivel column (6a) of fixed fork (6). Casing (1) is equipped with castors (2) in its lower part.

6 Claims, 3 Drawing Sheets

MOBILE WHEELCHAIR/CHAIR, IN PARTICULAR FOR THE DISABLED

This application claims priority to Polish Patent Application No. PL427721 filed on Nov. 9, 2018, which is incorporated herein by reference.

TECHNICAL FIELD

The invention relates to a mobile wheelchair/chair, in particular for the disabled.

BACKGROUND

From the state of the art, wheelchairs are known which due to the origin of propulsion energy are divided into those propelled by the user (usually by arms, very rarely by legs), driven by a typically electric motor, driven in a hybrid manner (e.g. by the muscles of the user and supporting electric motors), and propelled by another person. Today's wheelchairs have, regardless of the type of drive, a modular design. Some of the modules are basic modules such as frame or seat. Additional modules such as head and foot rests can also be used.

A typical wheelchair for the disabled includes:
 a) body support system (seat, back rest, side rests, foot rest, head rest, additional leg support devices),
 b) frame (seat frame and back rest frame),
 c) drive system (drive rims, swivel mechanism of front castors),
 d) wheels (usually two small front wheels and two large rear wheels).

Wheelchairs of this type are equipped with a seat with an adjustable back rest, raised arm rests and a safety belt. As a standard, wheelchairs also have a collapsible foot rest with one or two plates.

The body support system has an orthotic function, while the drive system with wheels has a transport function. All these elements are structurally linked by the frame.

Currently available wheelchairs are four- or three-wheelers.

The Blumil wheelchair is also known. It is an electric, two-wheeled vehicle, in which acceleration is caused by slight leaning of the body. To move around on Blumil one only needs to be able to lean one's body slightly forwards or backwards (using abdominal muscles or by pulling on one's hand), while change of direction occurs by a slight movement of one's hand. Blumil can be steered with the user's right or left hand, the same applies to the parking mechanism. It is equipped with a steering column, which is used i.a. for parking.

Another example is the Eurovema wheelchair. It is an electrically powered wheelchair for indoor use that provides freedom of movement at home and at work. The chair is equipped with a special chassis with six wheels. Its drive mechanism is located in the lower part of the wheelchair, the wheelchair rotates completely around its axis.

SUMMARY

The purpose of the invention is to deliver a wheelchair/chair which, thanks to a special wheel-drive module, provides the required maneuverability and is smaller in size compared to typical wheelchairs or chairs for people with reduced mobility.

The essence of the invention is a mobile wheelchair/chair, especially for the disabled, having a body support system mounted on the casing, a swivel and drive assembly and castors characterized in that the swivel and drive assembly equipped with a drive motor and a swivel motor has a form of a coupled vertical fixed fork furnished with at least one swivel wheel, and the seat is mounted on the steering and swivel axis of the fixed fork, with the swivel motor located in the upper part of the steering and swivel column of the fixed fork. The casing is equipped with castors in its lower part.

Preferably, the mobile wheelchair/chair has five castors. The drive motor is located in the swivel wheel.

The mobile wheelchair/chair is characterised in that the connecting element is constituted by a coupling, and in that it is equipped with a foot rest.

The solution according to the invention has a simple design, provides maneuverability and is smaller in size, which improves the mobility of a disabled person, especially in places with very limited usable space.

BRIEF DESCRIPTION OF THE DRAWINGS

The invention is depicted in the embodiment, where.

DETAILED DESCRIPTION

Figure 1:
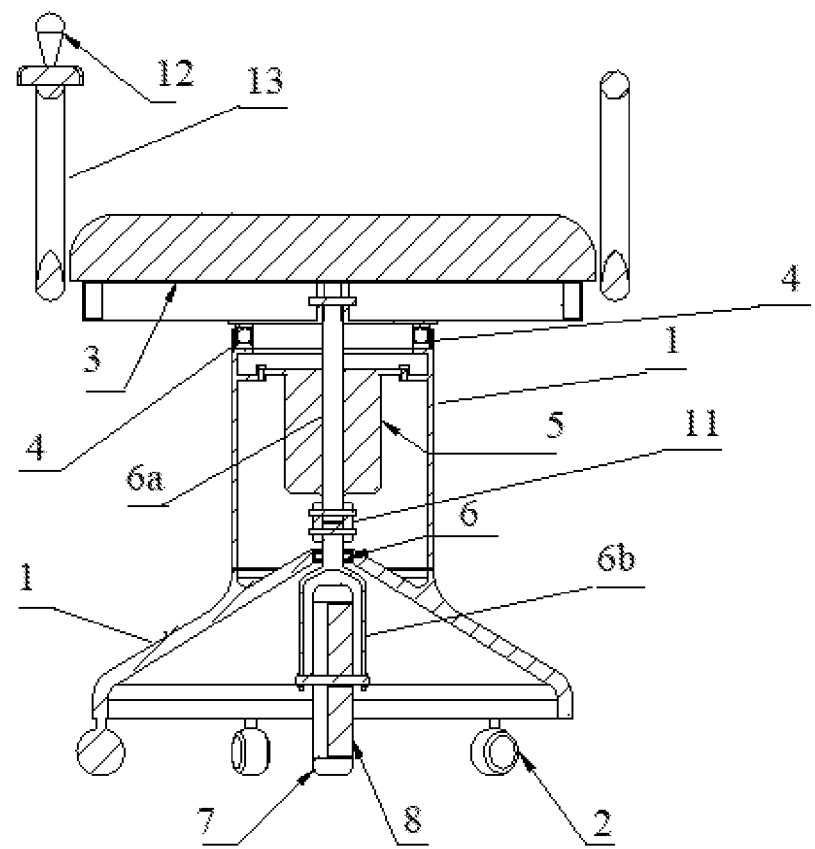
FIG. 1 represents the vertical section in the axis of the wheelchair, FIG. 2—the view of the wheelchair from the bottom and FIG. 3—the view of the wheelchair from the top in axonometric view.
Figure 2:
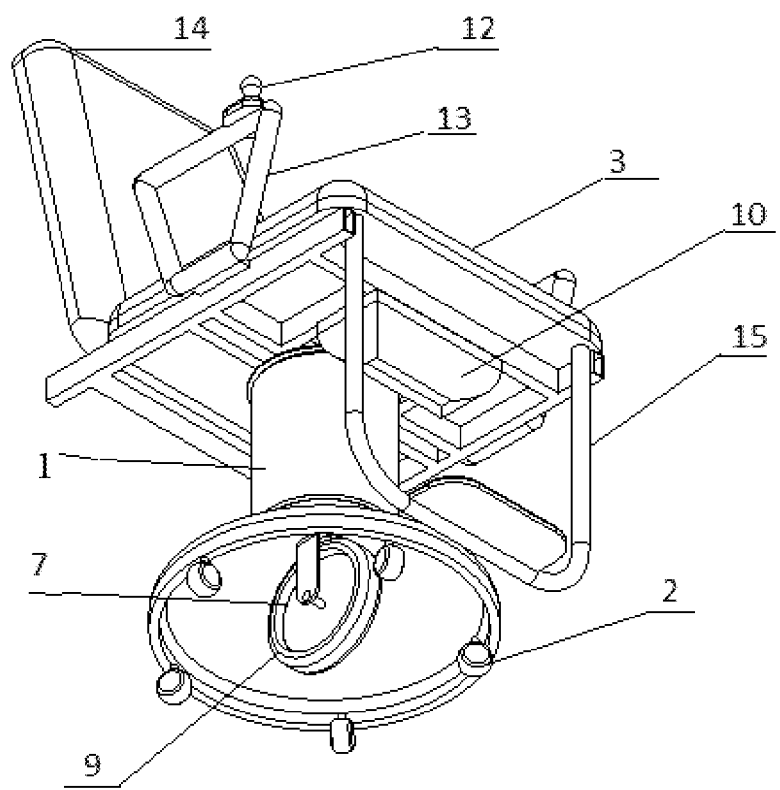
Figure 3:
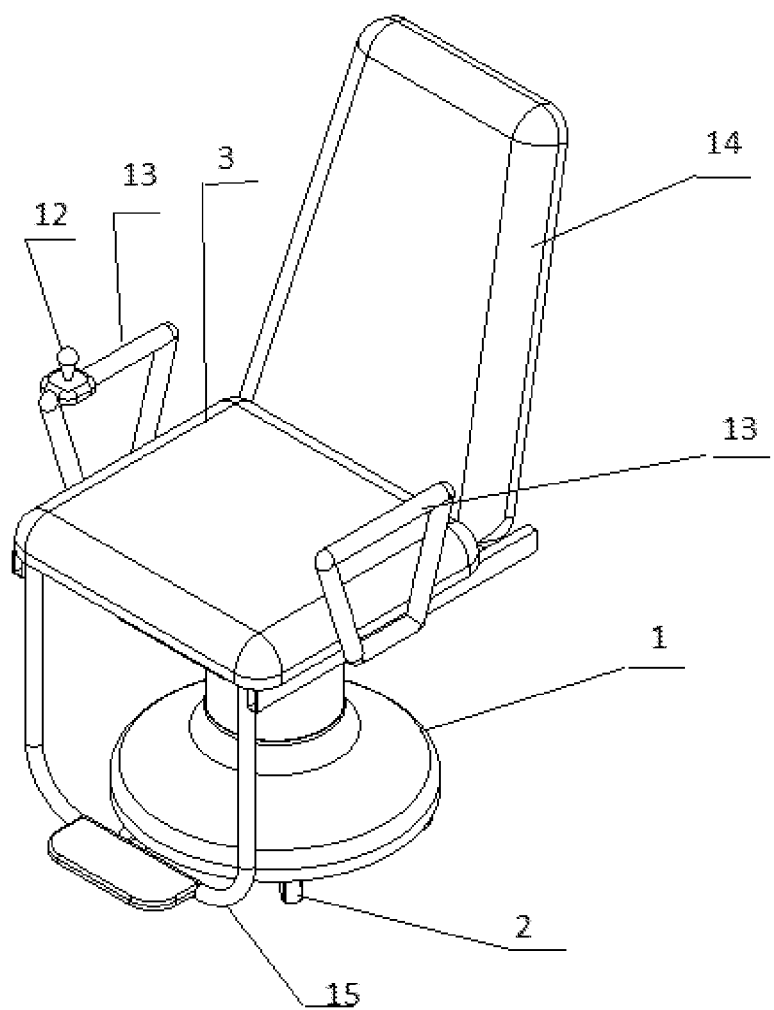

The solution of the invention is presented in the embodiment.

Casing 1 in the upper part has a cylindrical shape, is welded or made of aluminium casting and turns into a cone shape in the lower part and is mounted on the castor wheels 2, preferably five. On casing 1, seat 3 supported on the thrust bearing 4 is mounted. Inside casing 1, there is a wheelchair drive assembly consisting of swivel motor 5 of seat 3 placed in the upper part of the steering and swivel column 6a of fixed fork 6, while in the lower part 6b of fork 6 there is swivel wheel 7 with motor 8 in the hub of swivel wheel 7.

Swivel motor 5 rotates the steering and swivel axis of fork 6 and seat 3.

Swivel wheel 7 is equipped with flexible tyre 9 and rotates around its axis. Drive motor 8 is used to drive the wheelchair forwards and backwards. Motors 5 and 8 are electric, driven by 24 V DC energy from battery 10 located under seat 3. The steering and swivel axis of fork 6 is divided into 2 parts: upper 6a and lower 6b, which are connected by a connecting element in the form of coupling 11. The entire drive is controlled by joystick control 12. Joystick 12 is located on arm rest 13. Back rest 14 is slightly tilted to the rear. Back rest 14 and seat 3 are finished with textile or leather. Foot rest 15 for the feet is attached to seat 3 and moves together with seat 3.

The invention claimed is:

1. A mobile wheelchair/chair having a body support system mounted on a casing, the body support system further comprising: a swivel and drive assembly; and casters characterized in that the swivel and drive assembly are equipped with a drive motor (8) and a swivel motor (5) has a form of a coupled vertical fixed fork (6) furnished with at least one swivel wheel (7), and a seat (3) mounted on a steering and swivel axis of the fixed fork (6), with the swivel motor (5) located in an upper part of a steering and swivel column (6a) of the fixed fork (6).

2. The mobile wheelchair/chair according to claim 1, wherein the casing (1) is equipped with casters (2) in a lower part.

3. The mobile wheelchair/chair according to claim 1, further comprising five casters (2).

4. The mobile wheelchair/chair according to claim 1, wherein the drive motor (8) is located in the swivel wheel (7).

5. The mobile wheelchair/chair according to claim 1 further comprising a connecting element (11) wherein the connecting element is a coupling.

6. The mobile wheelchair/chair according to claim 1, further comprising a foot rest (15).

\* \* \* \* \*